United States Patent [19]

Carlström

[11] Patent Number: 5,330,238
[45] Date of Patent: Jul. 19, 1994

[54] COUPLER FOR CONNECTING TWO PLASTIC PIPES AND PROCESS AND MOLD FOR PRODUCING THE COUPLER

[75] Inventor: Börge Carlström, Oberwil, Switzerland

[73] Assignee: Hobas Engineering AG, Basel, Switzerland

[21] Appl. No.: 940,520

[22] Filed: Sep. 4, 1992

[30] Foreign Application Priority Data

Sep. 6, 1991 [CH] Switzerland .............. 2622/91

[51] Int. Cl.$^5$ .............................. F16L 47/00
[52] U.S. Cl. ................... 285/291; 285/345; 285/369; 285/915
[58] Field of Search .......... 285/235, 291, 345, 915, 285/369, 55, 417, 379

[56] References Cited

U.S. PATENT DOCUMENTS

| | | | |
|---|---|---|---|
| 2,302,244 | 11/1942 | Morrell | 285/369 X |
| 2,794,483 | 6/1957 | Hopkins et al. | 285/369 X |
| 3,430,989 | 3/1969 | Wendt | 285/235 X |
| 3,575,445 | 4/1971 | French | 285/369 X |
| 4,174,125 | 11/1979 | Wyss | 285/291 X |
| 4,229,028 | 10/1980 | Gray | 285/235 |
| 4,371,179 | 2/1983 | Bohman | 285/345 X |
| 4,400,019 | 8/1983 | Fruck | 285/55 |
| 4,565,381 | 1/1986 | Joelson | 285/110 X |
| 4,915,422 | 4/1990 | Chacon et al. | |
| 5,186,197 | 1/1993 | Thompson, Jr. | 285/921 X |

FOREIGN PATENT DOCUMENTS

| | | | |
|---|---|---|---|
| 2343958 | 10/1977 | Fed. Rep. of Germany | 285/235 |
| 0080110A3 | 3/1985 | Fed. Rep. of Germany | F16L 17/02 |
| 806525 | 12/1936 | France | |
| 1218062 | 6/1971 | France | B29D 31/00 |
| 479836 | 11/1969 | Switzerland | F16L 17/02 |

Primary Examiner—Randolph A. Reese
Assistant Examiner—Heather Chun
Attorney, Agent, or Firm—McGlew & Tuttle

[57] ABSTRACT

The coupler consists of an essentially cylindrical outer layer of glass fiber-reinforced plastic and an inner layer consisting of polyurethane. This inner layer has, approximately in the middle between the two coupler ends, a rib which serves as a stop for the ends of the two pipes to be connected to one another. The coupler has, between this rib and one coupler end (a), an approximately conical inner shape which has a diameter which increases in an outward direction, this conical surface also being provided with two sealing beads. A cylindrical section, a sawtooth-like rib and an annular groove are present between the other coupler end and the rib, A coupler of this type can be mounted relatively simply on the end of a pipe and can be nondetachably connected to it also by means of an adhesive, A pipe of essentially the same diameter can be inserted into the other coupler end and gives a tight fit in the coupler even when the axes of the coupler and the pipe do not coincide but make a small angle with one another.

4 Claims, 2 Drawing Sheets

COUPLER FOR CONNECTING TWO PLASTIC PIPES AND PROCESS AND MOLD FOR PRODUCING THE COUPLER

BACKGROUND OF THE INVENTION

Couplers are used for connecting two pipes. The couplers used are either cylindrical pipe sections into which one end of each pipe can be screwed or pushed and fastened in some manner from each side. However, it is also possible, during production, to provide one end of a pipe with an extension which serves as a coupler and into which the unextended end of an identical pipe can then be pushed. These two methods are also known in the case of plastic pipes. The advantages and the disadvantages of these types of couplers are also known.

To ensure a tight connection between the pipe and the sleeve, either the pipe or the coupler can be provided with sealing means. It is known that a groove can be provided close to the pipe end, in which groove a sealing means, such as, for example, an 0-ring or something similar, is housed. Since this reduces the wall thickness of the pipe, which is undesirable particularly in pipes which are laid in the ground and are governed by the pressing method, and therefore should be avoided, couplers which consist of a resilient inner part provided with lips and a covering of solid material applied on said inner part are also known. Couplers of this type are very complicated to produce and are therefore expensive.

SUMMARY OF THE INVENTION

It is an object of the invention to provide a coupler which has none of these above-mentioned disadvantages since it is formed in such a way that, owing to its internal sealing means, it can be pushed tightly onto a pipe end which is free of sealing means and, if desired, can be fastened to it, so that a further pipe can be inserted therein detachably but with a tight seal.

This object is achieved according to the invention by a coupler which is particularly suitable for connecting two seal-free, glass fiber-reinforced plastic pipes, wherein the coupler has an essentially cylindrical outer layer of glass fiber-reinforced plastic and, at least in the region of one edge, an inner layer which consists of integrally molded polyurethane and has an internal diameter decreasing toward the interior of the coupler, said diameter in a section between two edges being at least as large as at the edge with the larger internal diameter.

Various embodiments are possible, namely those which serve for connecting two pipes which have a cylindrical end section with a diameter smaller than that of the remaining pipe section and thus permit the production of a pipeline having a constant external diameter, i.e. a pipeline with no external beads or ribs, and also embodiments which can be mounted on shoulder-free pipes, i.e. pipes which have the same external diameter over the entire length.

It is furthermore an object of the invention to provide a process for the production of a coupler provided with sealing means and intended for connecting two plastic pipes free of sealing means, wherein the coupler has an essentially cylindrical outer layer of glass fiber-reinforced plastic and, at least in the region of one edge, an inner layer consisting of integrally molded polyurethane and having an internal diameter decreasing toward the interior of the coupler, wherein, in a section between the two edges, the internal diameter of the coupler is at least as large as at the edge with the larger internal diameter, and wherein a hollow cylinder of glass fiber-reinforced plastic is provided, by casting the molding, with an inner coating of polyurethane in such a manner that this coating gives the above-mentioned internal shape.

It is also an object of the invention to provide a mold for carrying out the process for the production of a coupler provided with a sealing means and intended for connecting two plastic pipes which are free of sealing means and are each provided with a cylindrical end section having a diameter $D_2$ which is smaller than the external diameter $D_1$ of the remaining pipe section, wherein the coupler has an essentially cylindrical outer layer of glass fiber-reinforced plastic and, at least in the region of one edge, an inner layer consisting of integrally molded polyurethane and having an internal diameter decreasing toward the interior of the coupler, wherein, in a section between the two edges, the internal diameter of the coupler is at least as large as at the edge with the larger internal diameter, wherein the coupler is twice as long as the cylindrical end section, wherein the external diameter of the coupler essentially corresponds to the external diameter $D_1$ of the remaining pipe section, wherein only one polyurethane layer beginning at one edge and extending only over up to 30–50% of the coupler length is present in the interior of the coupler, wherein a hollow cylinder of glass fiber-reinforced plastic is provided, by casting the mold, with an inner coating of polyurethane in such a manner that this coating gives the above-mentioned inner shape, wherein the mold consists of a baseplate and a mold ring which can be, or is, connected to it, in order to impart the inner shape to the polyurethane inner layer to be produced by casting, and wherein the baseplate has positioning means in order to position the hollow cylinder of glass fiber-reinforced plastic coaxially with the mold ring.

It is moreover an object of the invention to provide a mold for carrying out the process for the production of a coupler provided with sealing means and intended for connecting two shoulder-free plastic pipes free of sealing means, wherein the coupler has an essentially cylindrical outer layer of glass fiber-reinforced plastic and, at least in the region of one edge, an inner layer consisting of integrally molded polyurethane and having an internal diameter decreasing toward the interior of the coupler, wherein, in a section between the two edges, the internal diameter of the coupler is at least as large as at the edge with the larger internal diameter, wherein the inner layer has, approximately in the middle between the two coupler ends, a rib which serves as the stop for the pipes to be connected to one another, wherein the inner surface of the coupler widens conically from this rib to one coupler end and is provided with at least one sealing bead running all around, while a cylindrical section, a rib projecting in a sawtooth manner into the interior of the coupler and, adjacent to the radial flank of said rib, an annular groove are present between the other coupler end and the rib, the groove diameter n being larger than the internal diameter $D_4$ of the cylindrical section, the latter essentially corresponding to the diameter $D_5$ at the opposite coupler end, wherein a hollow cylinder of glass fiber-reinforced plastic is provided, by casting in a mold, with an inner coating of polyurethane in such a manner that this coating gives the above-mentioned internal shape, and wherein the mold has three individual parts, namely a first metallic part having a sleeve which serves for shaping the conical section and a lateral surface and the end surface of the rib and which is connected to an end plate extending radially outward and having a retaining ring which serves for holding the cylindrical, glass fiber-reinforced ring, a second cylindrical metal sleeve which serves for shaping the cylindrical section and a saw-tooth flank and can be pushed onto the first metal ring and a plastic ring which can be taken apart and serves for forming the annular groove.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the invention are described below with reference to the attached drawings. In the drawings.

DESCRIPTION OF THE PREFERRED EMBODIMENTS

Figure 1:
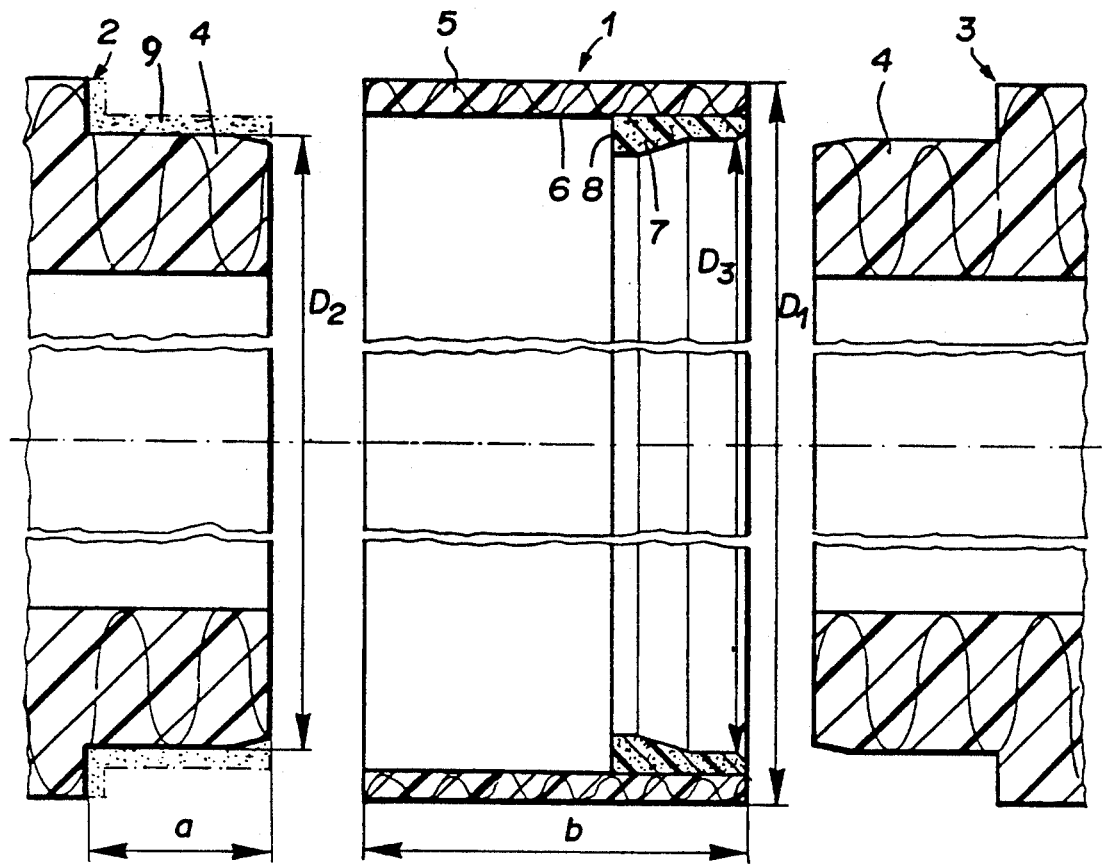
FIG. 1 shows a longitudinal section through a coupler according to the invention and through the two ends of the pipes to be connected to one another.

The coupler shown in FIG. 1 and designated as a whole by 1 and intended for connecting the two glass fiber-reinforced plastic pipes 2 and 3 has the same external diameter $D_1$ as both pipes 2 and 3. To permit it to be pushed onto the pipes, the latter are provided with cylindrical pipe end section 4 whose diameter $D_2$ is smaller than the diameter $D_1$ of the main pipe section. The coupler 1 itself consists of a cylindrical outer layer 5 of glass fiber-reinforced plastic and a sealing means for sealing the pipe 3 with the coupler 1. The sealing meaning includes an inner layer 7 which consists of integrally molded polyurethane but does not extend over the entire inner surface but only over a region beginning at the edge and extending over 30-50% of the coupler length, while the remaining inner surface 6 of the coupler 1 is polyurethane-free. The polyurethane layer 7 has, at the coupler edge, an internal diameter $D_3$ which corresponds to the external diameter $D_2$ of the cylindrical pipe end section 4 or is at most 0.5% greater than the external diameter. This diameter becomes smaller with increasing distance from the coupler edge and the contour of the inner surface may correspond to the view in the drawing but may also be different, for example rounded. It is essential that the inner diameter of the polyurethane layer decreases toward the interior of the coupler. In the embodiment shown, the polyurethane-free section 6 is bordered by an essentially radial surface 8 which, however, could also have a shape differing slightly therefrom. The length b of the coupler corresponds approximately to twice the length a of the cylindrical end section 4. This design ensures that a pipe section composed of such pipes and couplers has a uniform surface on the outside, so that such a pipe can be laid by the pressing process. If the coupler length b is slightly smaller than twice the length a of the cylindrical section, the individual pipes can abut one another directly, which is advantageous for transmission of the forces during driving. During use, the coupler 1 shown is pushed onto the plastic pipe 2 to the left of it and is firmly connected to the pipe by means of an adhesive 9 applied before the coupler is pushed on. The thickness of this adhesive layer must correspond to at least half the difference between the coupler internal diameter of the coupler 1 and the external diameter $D_2$ of the pipe end section 4. The pipe on the right is then inserted. It is quite possible to use pipes in which the end sections 4 have different diameters at the two end sections, namely a larger one on which the coupler is fastened by means of the adhesive and a smaller one which is inserted into the coupler and if necessary can also be withdrawn from it. As can be seen, it is also possible in this design to lay the pipes 2 and 3 not only coaxially with one another but also in such a way that their axes make a small angle with one another, the necessary tightness of the connection being ensured in all positions by the polyurethane layer.

Figure 2:
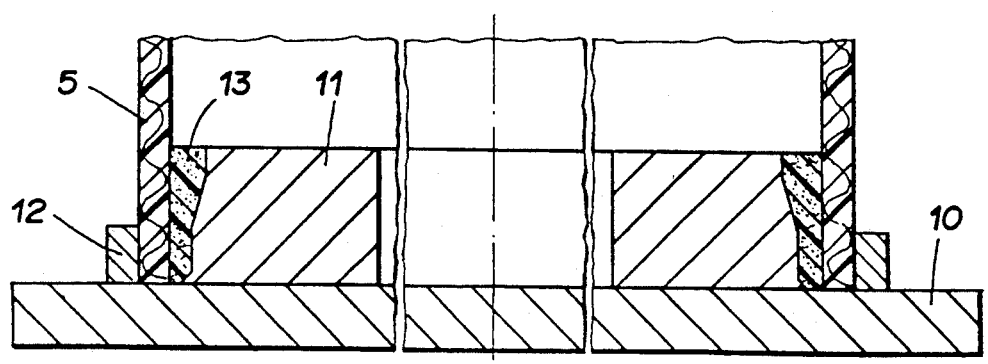
FIG. 2 shows a vertical section through a mold for the production of this coupler according to the invention.

As described below with reference to FIG. 2, such a coupler can be produced in a very simple manner. The mold used for production consists of a baseplate 10 and a mold ring 11 which is, or can be, connected to said baseplate, the baseplate 10 having positioning means 12 in order to mount the glass fiber-reinforced hollow plastic cylinder 5 coaxially with the mold ring 11 on the plate. These positioning means may be a ring or projections formed in another manner, for example pins, which are firmly or detachably connected to the baseplate 10. After the hollow cylinder has been mounted, the gap between it and the mold ring 11 is filled with polyurethane, with the result that the inner layer 7, which is firmly connected to the ring, is formed. For this purpose, it is of course necessary to treat the surfaces of the plastic ring in a manner known per se, so that a permanent connection between the inner layer 7 and the outer layer 5 is ensured. After solidification of this inner layer, the hollow cylinder 5 can be rotated and can be provided at its other end too with a polyurethane layer if the coupler is not to be connected nondetachably to a pipe end.

Figure 3:
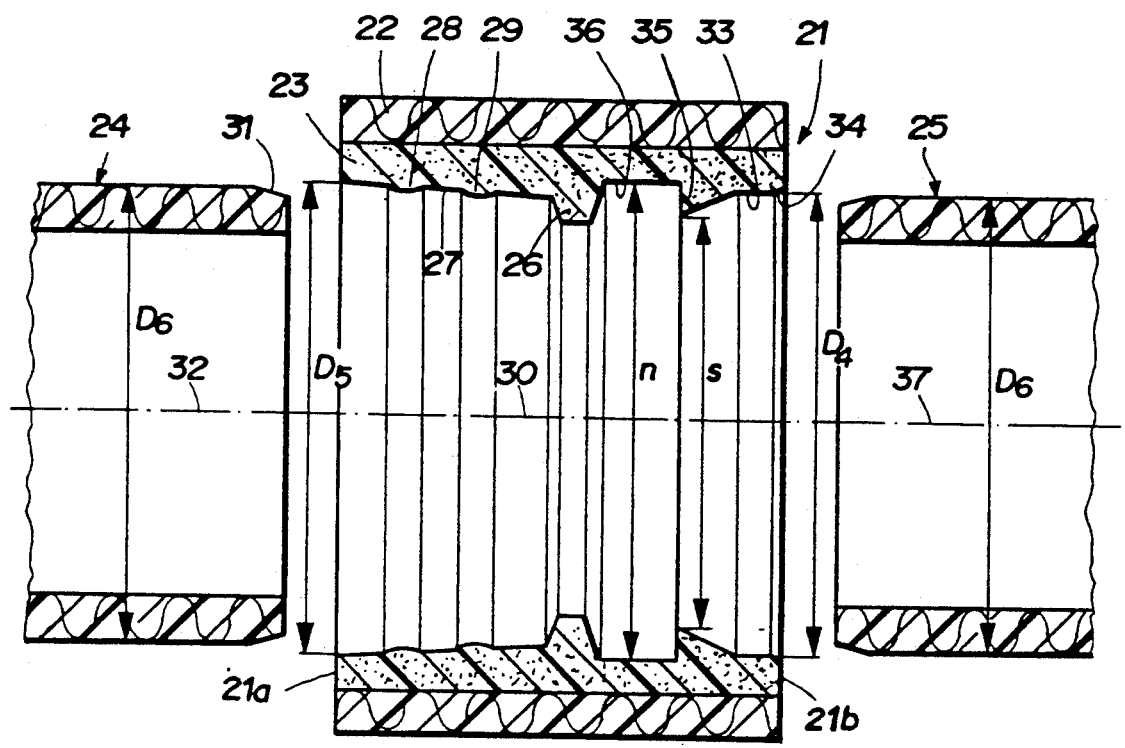
FIG. 3 shows a longitudinal section through another embodiment of a coupler according to the invention and through the two ends of the pipes to be connected to one another.

A second embodiment of the invention is shown in FIG. 3 of the drawing. The coupler designated here as a whole by 21 also has an essentially cylindrical outer layer 22 of glass fiber-reinforced plastic and an inner layer designated by 23 and consisting of polyurethane. This inner layer possesses, approximately in the middle between the two coupler ends 21a and 21b, a first rib 26 which serves as a stop for the two pipes 24 and 25 to be connected to one another. The inner surface 27 of the coupler widens conically between this rib 26 and one coupler end 21a, the left one in the drawing. In the embodiment, this conical surface is provided with two rather flat sealing beads 28 and 29 running all around. The conical inner surface 27 makes an angle of about 4° with the axis 30. If the internal diameter $D_5$ on the side 21a of the coupler 21 is a little larger than the external diameter $D_6$ of the pipe 24, the coupler can be readily pushed onto the pipe end. The bevel 31 at the pipe end, shown in the drawing, also makes it quite possible for the coupler to be pushed onto the pipe end without great difficulty in spite of the beads 28 and 29, until the rib 26 is at the pipe end. During this pushing-on procedure, the interior of the coupler does of course become slightly deformed and the polyurethane layer 23 is compressed, particularly in the region of the beads 28 and 29. If the exterior of the pipe or the interior of the coupler is provided with an adhesive, the coupler 21 can be connected permanently and nondetachably to the pipe 24 in such a way that the coupler axis 30 coincides with the pipe axis 32. The region in the pipe interior between the first rib 26 and the coupler end 21b on the right in the drawing is now somewhat different: at the very outside is a cylindrical section 33, which in this case can also be provided at its outer end with a bevel 34. This cylindrical section 33 is followed by a second rib 35 which projects in a sawtooth-like manner into the interior of the coupler, while an annular groove 36 is formed between this rib 35 and the rib 26. As can be seen from the drawing, the internal diameter n of the groove 36 is slightly larger than the internal diameter $D_4$ of the cylindrical section 33. The latter diameter essentially corresponds to the internal diameter $D_5$ at the opposite coupler end 21a, and it may be insignificantly smaller than the diameter $D_5$ at the free end of the conical section 27, particularly when the cylindrical part 33 is provided with a bevel 34. This coupler end 21b too is also intended for insertion of a pipe 25 having the external diameter $D_6$, the dimensions preferably being chosen so that $$D_6 \leq D_4 \leq 1.005 D_6$$

i.e. the internal diameter $D_4$ of the cylindrical section 33 is equal to or up to 0.5% greater than the external diameter $D_6$ of the pipe 25, while the diameter n of the groove 36 is 2% to 5% greater than the external diameter $D_6$ of this pipe. In contrast, however, the internal diameter s of the sawtooth rib 35 is 5% to 10% smaller than the external diameter $D_6$ of the pipe 25. Thus, $$(98.5/100)D_6 \leq s \leq (99.65/100)D_6.$$

These dimensions on the right side of the coupler make it easy to insert the pipe 25 into the coupler, ensure a tight seal by the sawtooth-like rib 35, which is deformed, i.e. compressed and slightly curved, on insertion of the pipe 25, and, by means of the groove 36, make it possible for the axis 30 of the coupler 21 to make a small angle of up to 5° with the axis 37 of the pipe 25.

On insertion of a very large and correspondingly heavy pipe, i.e. a pipe having a diameter of 1 m or more, a gap of uniform size will not be formed between the cylindrical inner surface 33 of the coupler and the outer surface of the pipe 25 but instead the pipe will rest on the bottom of the cylindrical surface 33 and, depending on the dimensions, a gap of up to 0.5% of the pipe diameter will form between the pipe 25 and the upper part of the cylindrical surface. However, a tight connection of the pipe 25 in the coupler 21 is still ensured because in fact the internal diameter of the sawtooth rib 35 is at least 0.35% smaller than the diameter $D_6$ of the pipe 25.

Figure 4:
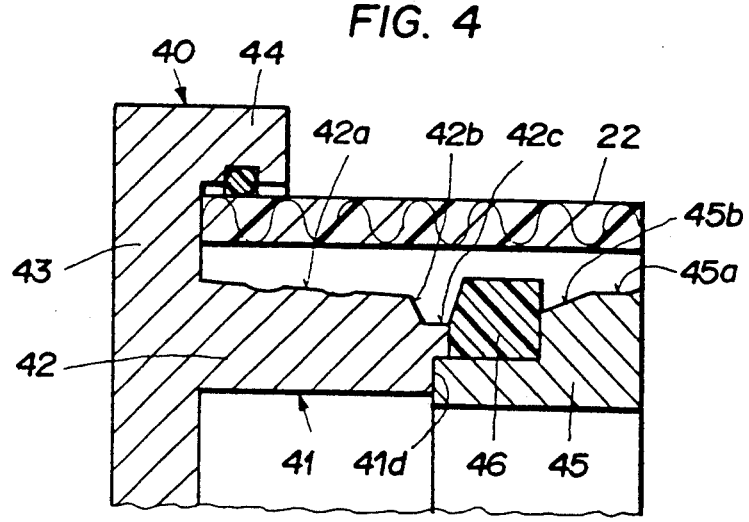
FIG. 4 shows a part of a longitudinal section through a mold for the production of the coupler shown in FIG. 3.

The coupler 21 described above is produced using a mold as shown in FIG. 4 and designated as a whole by 40. It consists of three individual parts, namely a first metallic part 41 having a sleeve 42, an end plate 43 and a retaining ring 44, a second metal sleeve 45 and a plastic ring 46 which can be divided up into individual segments.

The sleeve 42 has, on the outside, a section 42a for shaping the conical section 27 of the coupler, thereafter a section 42b for shaping one lateral surface of the rib 26 and a section 42c for shaping the end surface of this rib 26. The end plate 43 which is provided on its outer end with a retaining ring 44 which serves to hold a prefabricated, glass fiber-reinforced ring or hollow cylinder 22 coaxially with the sleeve 42 is integrally molded on that end of the sleeve 42 which faces away from the cylindrical surface 42c.

The metallic sleeve 45 has three different sections on its outer surface: at the very outside a cylindrical section 45a for forming the cylindrical surface 33, then a conical section 45b for forming the flank of the sawtooth 35 and thereafter a section of small diameter for receiving the plastic ring 46, which may consist of, for example, silicone and is divided up in such a way that it can be removed from the coupler 21 after the production of the inner layer 23 of the coupler 21, which layer consists of polyurethane. To ensure that the two parts 41 and 45 can be joined coaxially, the end surface of the sleeve 42 has an indentation 41d whose diameter corresponds to the diameter of the adjacent end surface of the sleeve 45.

The above description of the mold also indicates its use, i.e. a process for production of the sleeve 21 according to the invention: a cylinder 22 of glass fiber-reinforced plastic is taken and is placed in the mold 40, the space bordered by the hollow cylinder 22, the sleeve 42, the ring 46 and the sleeve 45 is filled with liquid polyurethane and, after solidification, first the mold part 41, then the sleeve 45 and finally the silicone ring 46 are removed; as is known by those skilled in the art, the inner surface of the glass fiber-reinforced plastic ring is formed in such a way that the polyurethane bonds firmly to it while the mold parts are treated so that the solid polyurethane can be readily detached from them.

While specific embodiments of the invention have ben shown and described in detail to illustrate the application of the principles of the invention, it will be understood that the invention may be embodied otherwise without departing from such principles.

What is claim is:

1. A coupler for connecting two pipes, the coupler comprising:

an outer layer having a coupler internal diameter and a coupler external diameter, said outer layer also having a first end and a second end, said coupler internal diameter between said first and second ends of said outer layer is substantially equal to an internal diameter of said outer layer at said second end;

a sealing means for sealing said outer a layer to one of the two pipes, said sealing means including an inner layer positioned inside said outer layer and extending from said first end of said outer layer toward said second end of said outer layer by a distance substantially equal to 30–50% of a length of said outer layer, said inner layer having a first end and a second end, said first end of said inner layer being positioned adjacent said first end of said outer layer, said inner layer having an internal diameter decreasing from said first end of said inner layer to said second end of said inner layer;

the two pipes each have a pipe external diameter substantially equal to said coupler external diameter, said two pipes also each have a pipe end section with a pipe end external diameter smaller than the pipe external diameter, each of said pipe end sections being substantially half as long as said outer layer.

2. A coupler in accordance with claim 1, wherein:
said inner layer is formed of polyurethane;
the two pipes are plastic and the pipe end sections are substantially cylindrical;
said outer layer is substantially cylindrical and formed of glass fiber-reinforced plastic.

3. A coupler in accordance with claim 1, wherein:
a magnitude of said internal diameter of said inner layer at said first end is of a range between the pipe end external diameter and 0.5% greater than the pipe end external diameter;
a smallest magnitude of said internal diameter of said inner layer is of a range 035 to 1.5% smaller than the pipe end external diameter.

4. A coupler for connecting two pipes, the coupler comprising:
an outer layer having a first end and a second end;
a sealing means for sealing said outer layer to the two pipes, said sealing means including an inner layer positioned inside said outer layer and extending from said first end of said outer layer to said second end of said outer layer, said inner layer having a first end and a second end, said first end of said inner layer being positioned adjacent said first end of said outer layer, said inner layer including a stop means positioned substantially at a middle point between said first and second ends of said inner layer and for stopping the two pipes from extending further into the coupler, said stopping means including a first rib, an internal diameter of said inner layer increasing from said first rib to said second end of said inner layer, said inner layer including a sealing bead between said rib and said second end of said inner layer, a second rib positioned between said first rib and said first end of said inner layer, said second rib projecting into an interior of the coupler, said inner layer having a cylindrical section between said first end and said second rib, said inner layer having an annular groove between said first rib and said second rib, an internal diameter of said inner layer at said first end substantially equals an internal diameter of said inner layer at said second end, an internal diameter of said annular groove being larger than said internal diameter of said inner layer at said first and second ends;

the two pipes each have a pipe external diameter less than said internal diameter of said inner layer at said first and second ends, said internal diameter of said inner layer at said first and second ends being smaller than 100.5% of said pipe external diameter, an internal diameter of said second rib being larger than 98.5% of said pipe external diameter and less than 99.65% of said pipe external diameter.

* * * * *